(12) United States Patent
Rösler et al.

(10) Patent No.: US 7,172,235 B2
(45) Date of Patent: Feb. 6, 2007

(54) ROOF AND DECKLID HAVING A COMMON SUPPORTING LINKAGE AND ACTUATOR

(75) Inventors: Matthias Rösler, Stuttgart (DE); Thomas Halbweiss, Remseck (DE); Johannes Reichel, Ditzingen (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 11/403,634

(22) Filed: Apr. 13, 2006

(65) Prior Publication Data

US 2006/0249978 A1 Nov. 9, 2006

Related U.S. Application Data

(63) Continuation of application No. PCT/EP2003/012928, filed on Nov. 19, 2003.

(30) Foreign Application Priority Data

Oct. 16, 2003 (DE) ................ 103 48 726

(51) Int. Cl.
*B60J 7/00* (2006.01)

(52) U.S. Cl. .............. 296/107.08; 296/107.11; 296/109

(58) Field of Classification Search .......... 296/76, 296/107.08, 107.11, 109, 116, 117, 136.03
See application file for complete search history.

(56) References Cited

U.S. PATENT DOCUMENTS

| 2,704,225 | A | | 3/1955 | Anscheutz et al. |
| 2,939,742 | A | | 6/1960 | Dardarian et al. |
| 6,293,605 | B2 | * | 9/2001 | Neubrand .............. 296/107.08 |
| 6,652,017 | B2 | * | 11/2003 | Wagner et al. ......... 296/107.08 |
| 2002/0014782 | A1 | * | 2/2002 | Neubrand .............. 296/107.08 |
| 2002/0105205 | A1 | * | 8/2002 | Willard ................ 296/107.07 |

FOREIGN PATENT DOCUMENTS

| DE | 198 46 006 A1 | 4/2000 |
| DE | 199 32 500 A1 | 2/2001 |
| DE | 100 59 342 A1 | 6/2002 |
| DE | 101 49 456 A1 | 4/2003 |
| EP | 0 835 778 A1 | 4/1998 |

* cited by examiner

Primary Examiner—Lori L. Coletta
(74) Attorney, Agent, or Firm—Brooks Kushman P.C.

(57) ABSTRACT

A passenger car having a roof opening and a rear opening that are selectively covered by a segmented dimensionally stable roof and a rear lid, respectively. A linkage and actuator drive are common to the roof and rear lid. A supporting structure of the rear lid is connected to a rear roof section. The roof sections are connected by four bar linkages to adjacent sections. The angular position of a supporting link relative to the vehicle body is changed by the actuator drive.

17 Claims, 6 Drawing Sheets

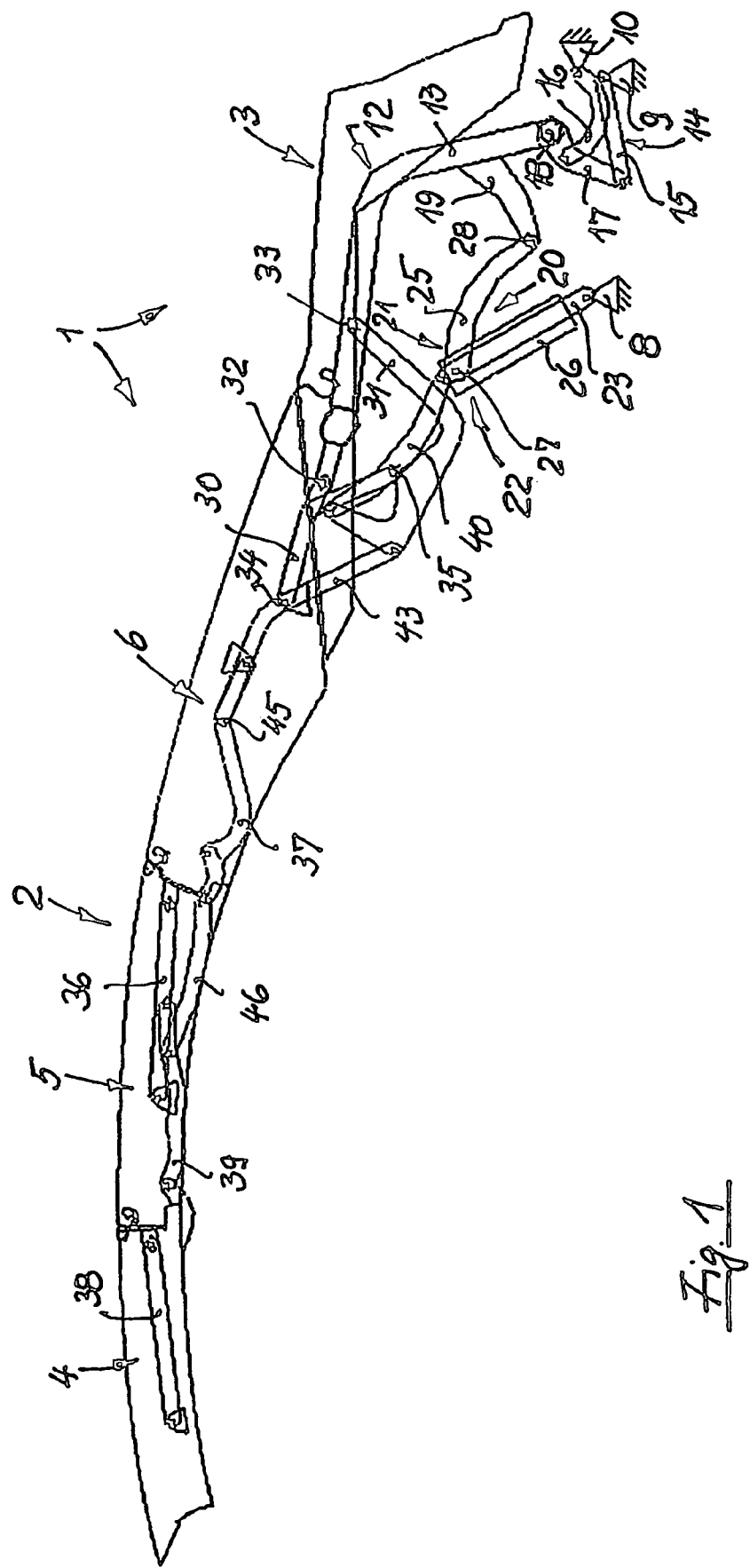

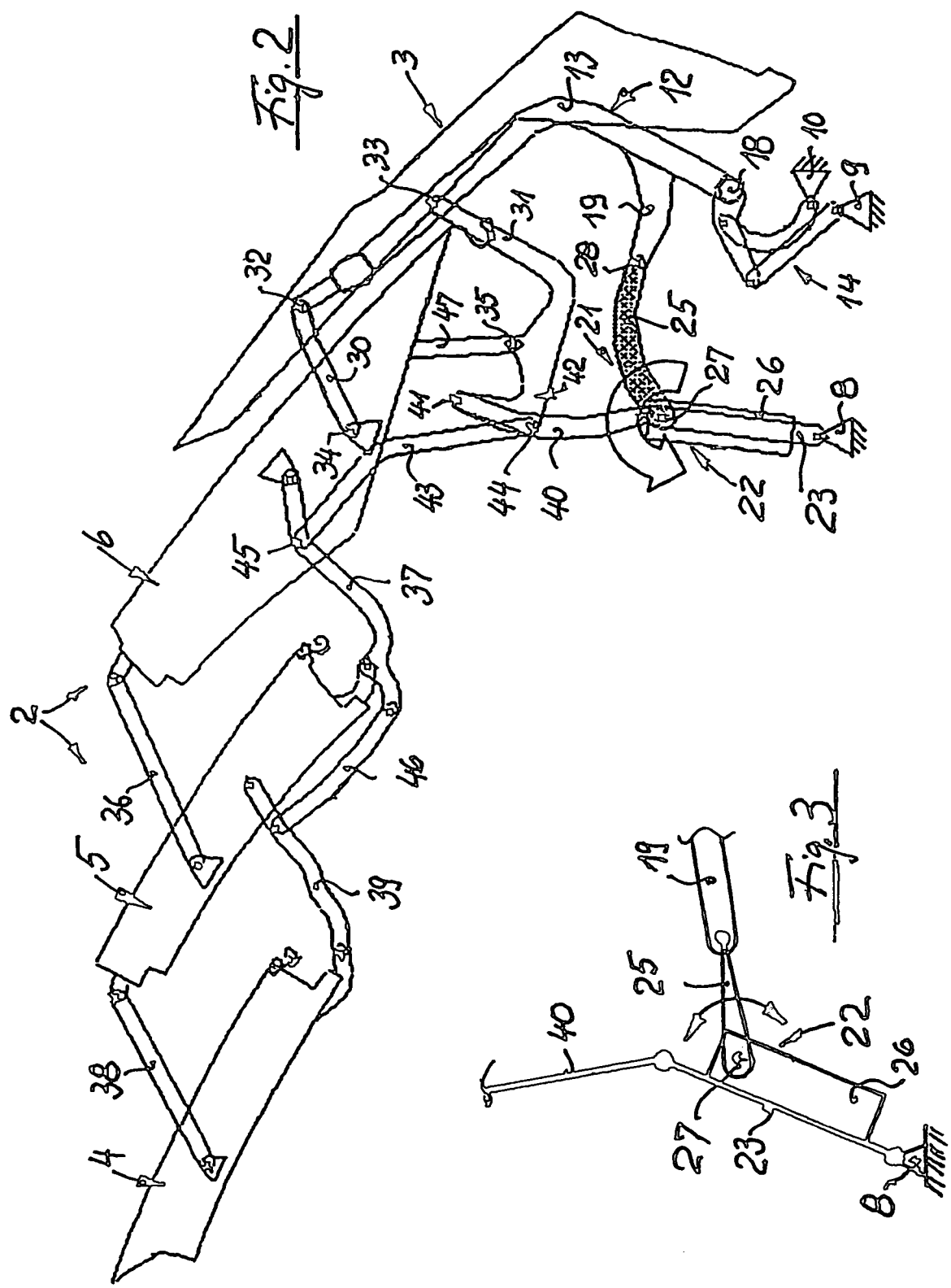

ROOF AND DECKLID HAVING A COMMON SUPPORTING LINKAGE AND ACTUATOR

CROSS-REFERENCE TO RELATED APPLICATIONS

This application is a continuation of PCT application Ser. No. PCT/EP2003/012928, filed Nov. 19, 2003.

BACKGROUND OF THE INVENTION

1. Field of the Invention

This invention relates to a passenger car with body openings that are selectively covered by a roof and decklid that share a supporting linkage and actuator for opening and closing the body openings.

2. Background Art

U.S. Pat. No. 2,704,225 discloses a vehicle with pontoon design and open body. In addition to the usual body openings to be closed by windows and doors, the vehicle has a rear access opening to a storage compartment, and a roof opening that covers the passenger compartment. These latter openings have cover elements in the form of a rear lid and a roof cover, which consists of a plurality of dimensionally stable roof sections that abut each other, and extend transversely over the vehicle interior with the roof cover closed. The roof sections overlap each other while retaining their mutual alignment with the roof cover opened and form a roof section package to be stowed in the rear storage compartment with the rear lid opened upwardly to the rear. The roof sections forming the roof cover and the rear lid have a shared actuating drive. The roof sections are in turn each connected in a supporting and adjustable manner with the next, wherein the roof cover is supported against the body via the rear roof section adjacent to the rear lid. The rear roof section, just as the preceding roof sections relative to each other, is supported against the body by a four-bar kinematic mechanism for which the connecting rod lies opposite the body base formed by the rear roof section.

The link in the four-bar kinematic mechanism that supports the rear roof, that is in front as viewed in the traveling direction, is actuated by means of an actuating drive. The actuating drive is provided on each vehicle side and is comprised of an actuating cylinder coupled to the rear body area of the storage compartment. Each actuating drive is located adjacent to the rear link in the four-bar kinematic mechanism. A driving rod extends to a supporting structure of the rear lid, so that the rear lid is opened upwardly to the rear around a rear swiveling axis during the opening and closing motion of the roof cover as the roof cover is either closed or removed. The rear lid must be swivelled up toward the front for loading the storage compartment. The large regulating distances inherent in such a structural design for the kinematic linkages allocated to the rear roof section take up a large amount of space. The large number of necessary coupling points also increases the cost of the assembly.

EP 0 835 778 B1 discloses another vehicle with open body and multipart roof cover consisting of dimensionally stable roof sections. A shared rotational drive allocated to the rear roof section is provided for the roof sections, and is used to swivel the rear roof section. The process of overlapping the front roof sections relative to the rear roof section is performed by link couplings between the roof sections and between the rear roof section and a fixed coupling point on the body. In this solution, the rear roof section is directly supported by means of a short bracing lug against the rotational axis of the rotational drive. The rotational drive lies near the vehicle equator, largely eliminating the link coupling points and their broad swiveling distances that impair the storage compartment for the roof cover. However, adjustment of the rear lid is not synchronized with the adjustment of the roof cover, thereby necessitating a separate drive for the rear lid if it has an automatic drive. The drive itself must be synchronized with the drive for the roof cover via corresponding control electronics, which increases the cost of the assembly.

A solution similar to the one involving this roof cover in terms of the drive and folding of roof sections is disclosed in U.S. Pat. No. 2,939,742, in which the rear roof section has a swiveling axis on the body. The rear roof section can be driven by an electric motor around the swiveling axis via a gear connection. The front roof section is folded under the rear roof section following the rear roof section when the roof cover is switched from its closed position covering the passenger compartment into a folded stowage position in the rear storage compartment. The rear lid is adjusted independently, and must be controlled accordingly, which increases the cost of the assembly.

Cover elements for body openings at the access to rear storage compartments are also known for passenger cars in the form of rear lids, which accommodate additional cover sections at the transition to the vehicle interior, e.g., in the form of a package shelf. One such solution is disclosed in DE 199 32 500 C2 wherein the rear lid is swivel up into a front and rear opened position. The rear lid is provided with a separate supporting structure used for coupling to the body shell. The rear lid can be adjusted to assume one of its opening positions relative to the body shell. The supporting structure normally forms a supporting frame and also supports the cover section serving as a package shelf, for example, when coupled by way of a parallelogram linkage, thereby enabling additional adjustments of the package shelf relative to the rear lid.

DE 198 46 006 A1 discloses a vehicle with an open body, the roof cover of which extends starting from the cowl with a roofline sloping downwardly toward the back towards rear of the vehicle. The roof cover consists of three rigid cover elements, of which the back one is provided with the rear window. The back cover element is immovably coupled to the body at the rear via a transverse vehicle axis in the area of the vehicle equator. The back cover element carries the two front cover elements that cover the passenger compartment as roof sections. The one front cover element at the rear cover element and the other front cover element are each hinged by means of a kinematic linkage with the roof cover closed. With the roof cover open, the front cover element is inwardly swivelled under the central cover element, and the central cover element is inwardly swivelled under the rear cover element. The resultant package may be stowed in a rear storage compartment. The rear cover element forms a seal above the rear storage compartment, similar to a rear lid. To adjust the roof cover between its open and closed position, the rear cover element is actuated by an actuating cylinder unit projecting up from the body. The front cover elements are adjusted relative to the rear cover element via an actuating cylinder arrangement extending in the longitudinal direction of the roof cover.

DE 101 49 456 A1 discloses a passenger car with a pontoon design having a multipart roof cover and rear lid. Separate supporting and driving connections are provided on the body for the rear roof section and the preceding front roof sections. These body connections consist of a kinematic linkage that engages the central roof section of the front roof sections and is comprised of a central and preceding roof section, and of a kinematic linkage that is provided to connect the back roof section to the rear lid. With the rear lid in the open position opened upwardly and to the rear, these body connections can be used stow the roof elements in a storage compartment to be covered by the rear lid. The back roof section covers the central roof section, and also the front roof section lying under the central roof section. This structural design requires two actuator drives that are independent from each other or controlled as a function of each other, along with separate body connections.

SUMMARY OF THE INVENTION

The object of the invention is to provide a vehicle having body openings that are closed by cover elements in the form of a roof cover and rear lid in such a way as to simplify the drive and support for the cover elements without incurring any loss of function.

According to one aspect of the invention, the roof cover is carried by the supporting structure of the rear lid that is recessed relative to the roof cover. The roof cover has a rear roof section at the height of the vehicle equator. The supporting structure of the actuator drive for the rear lid and the roof cover carried by the rear lid. At least one additional drive is used for joint adjustment, regardless of whether the roof cover, or parts of the roof cover, is adjustable relative to the rear lid, or relative to each other. This eliminates separate body couplings for the roof cover, and also creates an opportunity to reduce the cost of the assembly, and potentially may reduce the space required for the actuator drive. The actuator drive is designed as a rotational drive that is integrated into the kinematic linkage which connects the rear lid or supporting structure of the rear lid with the body. In this connection, it is particularly advantageous to drive the roof cover and rear lid together, and only via the actuator drive.

The actuator drive is preferably provided as a rotational drive in the connection between two of the links of the kinematic linkage. The configuration is one in which the one link is comprised of the swiveling arm of the rotational drive allocated to the other link. This makes it possible to use simple, linear rotational drives, e.g., spindle drives, which only require a little extra space given an extension identical to the supporting link. In addition, the required structural space is also reduced by virtue of the fact that the swiveling axis of the rotational drive coincides with the connecting axis of the two links, forming the latter. The capability of the links to swivel relative to each other, meaning to change their angular position, offers a simple way of varying the support distance between the body coupling of the one link and the supporting frame coupling of the other link. The mutual angular position of the links relative to each other along with their varying swiveling positions can advantageously be used to branch the drive for adjusting the roof sections relative to each other away from the drive for the supporting structure of the rear lid. The drive for adjusting the rear roof section in relation to the supporting structure of the rear lid yields only those couplings overall as the body shell supports for the rear lid and the roof cover are carried by the latter or its supporting structure that connect the rear lid or its supporting structure with the body. The framework of the invention also encompasses the provision of at least one extra drive connecting the roof sections to the rear lid or the roof sections to each other to go along with the actuator drive that actuates the rear lid.

Instead of coupling the structure to the body around a rigid swiveling axis as enabled in this conjunction, this coupling can also be effected by a linkage, in particular a four-bar linkage provided that the actuator drive for the supporting structure and the rear lid acts on the supporting structure in a corresponding manner. The configuration of the actuator drive as a rotational drive lying between two link arms may result in corresponding swiveling motions of the link arms relative to each other and in relation to the body or supporting structure.

The swiveling motions are used for coupling the rear roof section to the supporting structure by means of a kinematic linkage. The kinematic linkage is designed as a four-bar linkage in order to swivel the rear roof section relative to the supporting structure via a driving link. The driving link preferably connects one of the links of the kinematic linkage with one of the links that is coupled by the actuator drive. In one embodiment, the driving link which is linked to the body is coupled with the link supporting the actuator drive.

The link supporting the rotational drive is forwardly shifted with its body coupling relative to the body coupling of the supporting structure of the rear lid. The link drives the swiveling arm counterclockwise via the rotational drive in such a way that the swiveling arm, proceeding from the closed position of the roof cover and with the swiveling arm extending diagonally downward toward the rear, swivels up via the body coupled link supporting the rotational drive into a position corresponding to the stowed location of the roof. The link supporting the rotational drive projects toward the back, with the swiveling arm extending in essentially the opposite direction as the initial position of the swiveling arm for a closed roof cover.

The back roof section is coupled to the supporting structure of the rear lid by means of a four-bar kinematic mechanism. The forward roof sections are each preferably also connected by a four-bar kinematic mechanism with the next roof section within the framework of the invention. The three roof sections are coupled by a four-bar kinematic mechanism. The central roof section is coupled by the four-bar kinematic mechanism with the rear roof section, the front roof section is coupled by another four-bar kinematic mechanism with the central roof section, and the respective four-bar kinematic mechanisms are connected with respect to their respective rear connecting links via a driving link.

As a result, a multipart, and in particular three-part roof cover, can be realized with the roof sections being disposed one in back of the other with the cover closed. The roof sections are stacked one atop the other with the cover open, wherein the rear roof section covers the central roof section, the central roof section covers the front roof section, and the upper side of the roof sections each remain upwardly aligned in accordance with their position with the roof cover closed, so that they exhibit identical cambering. With the roof cover removed and rear lid closed, a layered roof package is provided that is conformed to the shape of the rear lid, only requires a minimum of space, and even has a minimized space requirement with respect to its body shell couplings.

Additional details and features of the invention are described in the claims. Further, the invention will be described with additional details and features below with the aid of schematic drawings.

BRIEF DESCRIPTION OF THE DRAWINGS

FIG. 1 is a side elevation view of the cover elements, the corresponding body openings for the roof cover and rear lid, specifically a roof opening and an access opening to a rear storage and stowage compartment, which is also intended to accommodate the roof sections of the multipart roof cover in its storage position;

FIG. 2 is a side elevation view of the roof cover and rear lid derived from FIG. 1 in a transitional position between the closed and open position of the roof cover;

FIG. 3 is a schematic view depicting a possible configuration of the actuator drive for the rear lid, which carries the preceding roof cover by way of a supporting structure, and the drive of which also drives the roof sections in a correspondingly synchronized manner as they switch between the closed and open positions of the roof cover;

FIG. 4 is a side elevation view of the cover elements in an intermediate position while switching the roof cover and rear lid, wherein FIG. 4 depicts a position that approximates the storage position for the cover elements to a greater extent than FIG. 2;

FIG. 5 is a side elevation view of the cover elements in another intermediate position wherein the roof sections have already largely been inwardly swivelled under the rear lid that is correspondingly swivelled upwardly open and to the back, as well as;

DETAILED DESCRIPTION OF THE PREFERRED EMBODIMENT(S)

Figure 4:
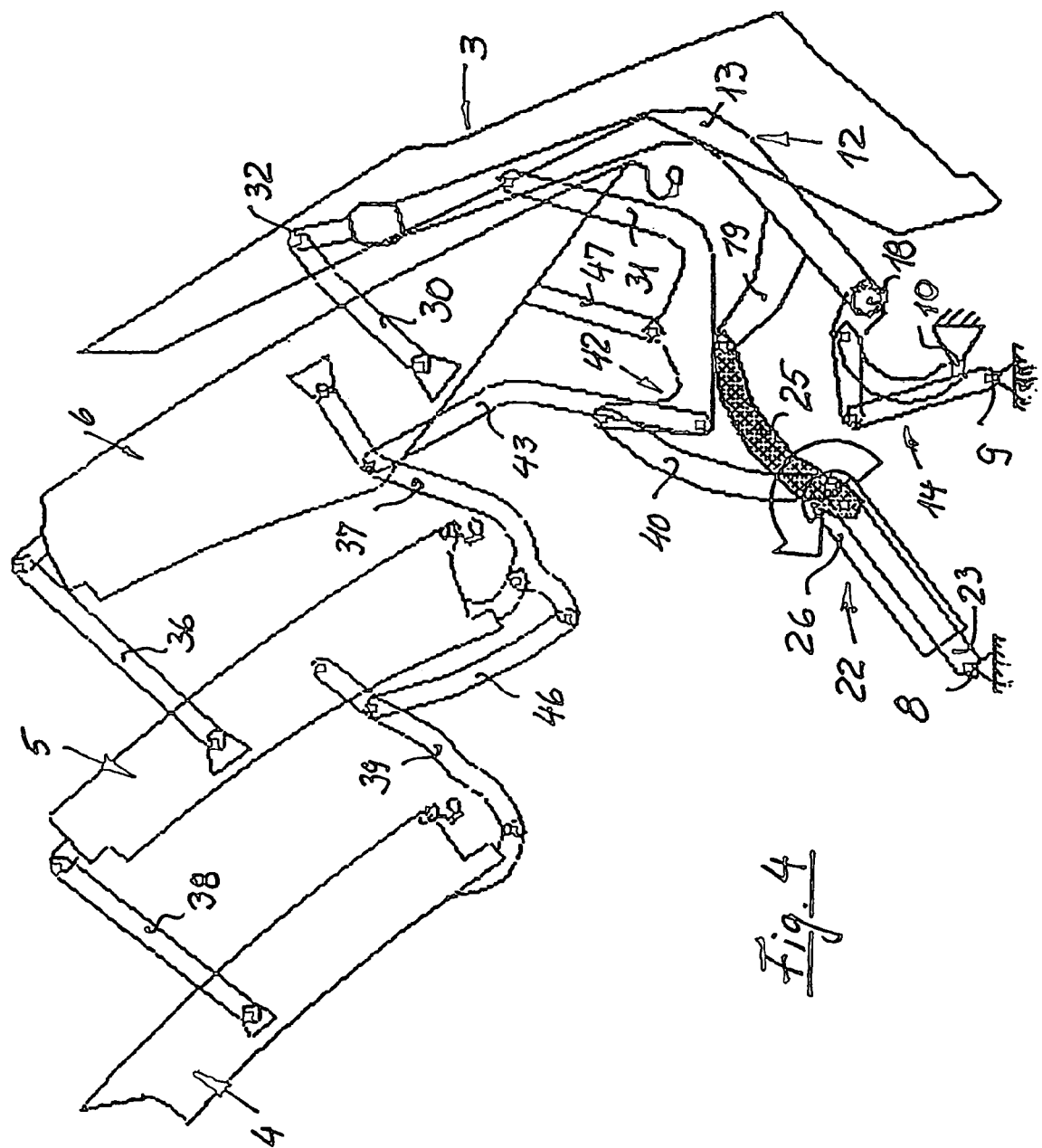
Figure 5:
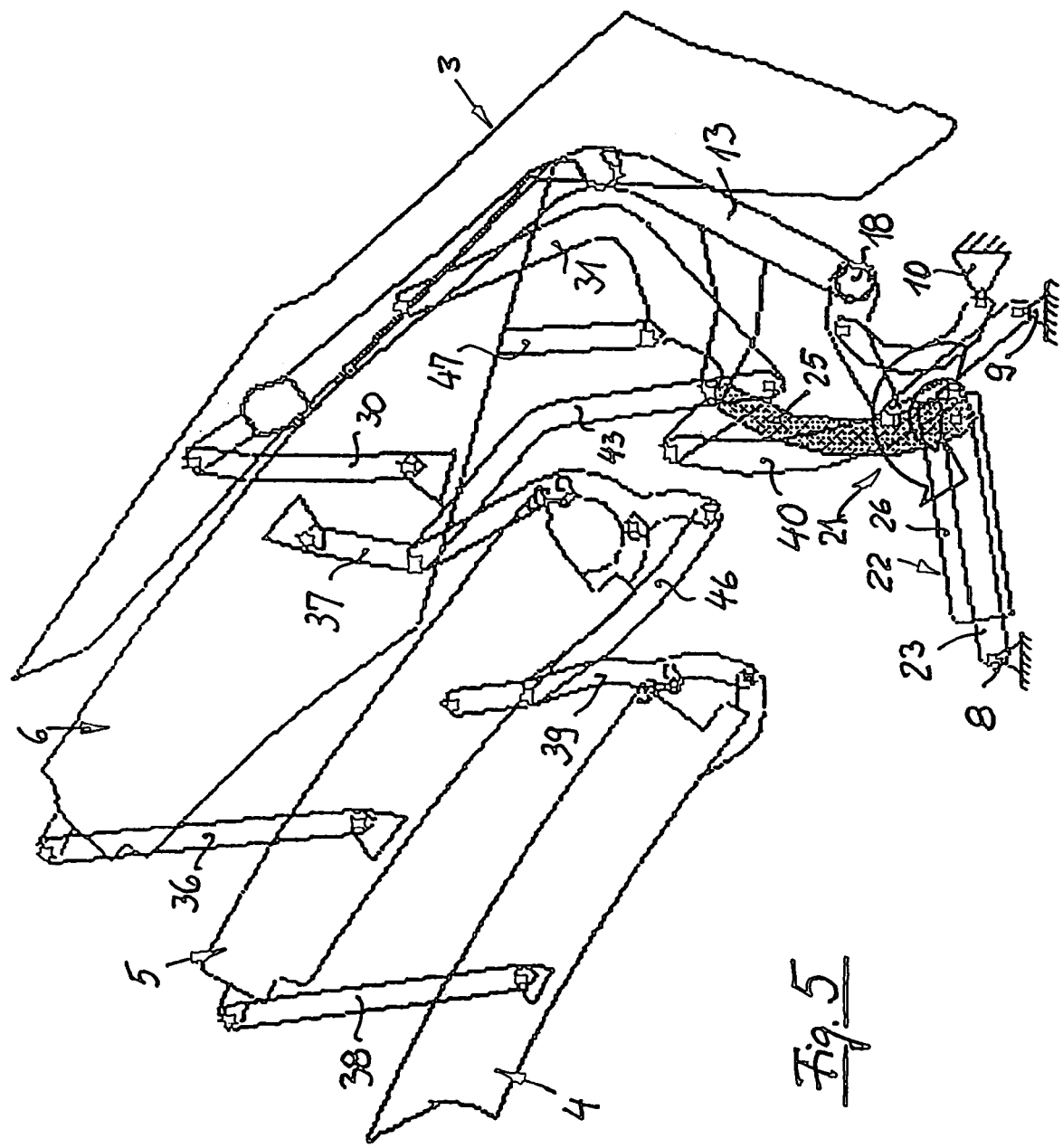

FIG. 1 depicts a convertible vehicle with an open body, and depicts the cover elements 1 arranged over the roof opening extending over its passenger compartment and the access opening extending over its rear storage compartment. A roof cover 2 covers the roof opening. A rear lid 3 covers the access opening. The roof cover 2 consists of several roof sections 4 to 6 adjacent to each other in the longitudinal vehicle direction. The roof section 4 forms the front roof section abutting the cowl of a windshield (not shown). The central roof section is indicated as 5, and the rear roof section is indicated as 6. The rear roof section 6 runs down and to the back, while the roof sections 4 and 5 run essentially horizontal in the closed position of the roof cover 2 shown in FIG. 1. The rear roof section 6 extends onto the rear lid 3, which extends toward the back running essentially at the level of the equator in accordance with the basic, pontoon shape of the vehicle body. The rear lid 3 transitions gradually into a cover section angled downwardly to the back, which normally ends at the level of the rear bumper of the vehicle body. The rear roof section with its rear window extends onto the rear lid, at an angle to it.

The storage compartment covered by the rear lid 3, acts in part as a stowage compartment for the removed roof cover 2, and otherwise functions as a luggage compartment. The storage compartment incorporates the body couplings 8 to 10, which are preferably allocated to the rear area of the storage compartment as schematically indicated. The body couplings 8 to 10 are used to support the cover elements 1 on the body. The actuator drive 21 is used to drive the rear lid 3 and roof cover 2.

The roof cover 2 is carried by the supporting structure 12 of the rear lid 3, which is depicted as a supporting frame. In particular, the supporting frame may be a tubular frame 13 that is supported on the body by the couplings 9 and 10. The tubular frame 13 and couplings 9 and 10 are preferably connected via a kinematic linkage 14 in the form of a four-bar linkage. Links 15 and 16 are pivoted on the body via couplings 9 and 10, and are coupled opposite the body base formed by the couplings 9 and 10 with an extension arm 17 of the tubular frame 13. Instead of being coupled to the body via the kinematic linkage 14, a stationary swiveling axis to the body can also be allocated to the tubular frame 13 via the extension arm 17.

The tubular frame 13 that forms the supporting structure 12 exhibits a U-shaped basic shape when viewed from the top. The longitudinal legs are angled in the shape of an L when viewed from the side. The leg section is angled downwardly to the back according to the essentially symmetrical design of the body of the vehicle relative to the longitudinal vehicle central plane overall by means of a transverse web 18. The extension arms 17 essentially project diagonally downward from the web 18 in the area of the longitudinal legs. In the initial position according to FIG. 1, the coupling points of the links 15 and 16 on the body and console each lie on upwardly running straight lines, sloped diagonally downward in front in the exemplary embodiment.

Additional projections 19 have provided at the longitudinal legs of the tubular frame 13 in the area of their downwardly projecting leg section are rigidly secured to the frame. The frame is connected by a link arrangement 20 with the body coupling 8. A rotational drive 22 is integrated into the link arrangement 20 as an actuator drive 21 for the rear lid 3 and the roof cover 2. The actuator drive 21 can also be integrated into one of the body couplings within the framework of the invention. Other types of actuator drives can also be used.

In the exemplary embodiment, the link arrangement 20 is formed by a supporting link 23 pivotally connected to the coupling 8 and a link as a driving swivel arm 25 of the rotational drive 22. The rotational drive 22 is immovably secured to the supporting link 23 relative to its motorized drive component 26, and encompasses the mount and drive for the driving swivel arm 25. The swiveling axis of the swivel arm 25 is indicated as 27. This is schematically illustrated in FIG. 3, wherein the projection 19 of the tubular frame 13 is also shown in the area of its swiveling axis 28 relative to the driving swivel arm 25.

Figure 6:
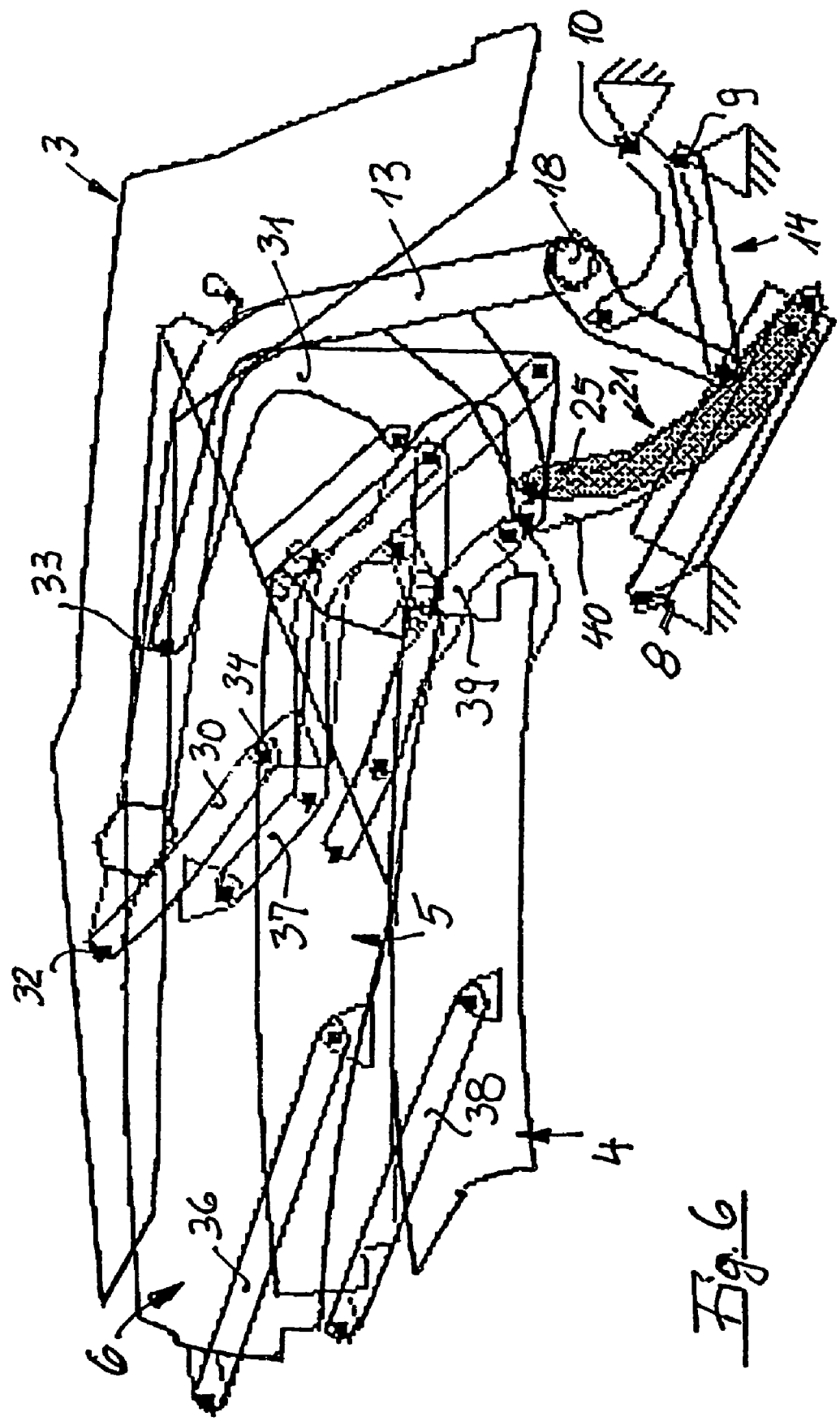
FIGS. 6 and 7 are side elevation views in which the roof elements assume their storage position inside the storage compartment (not shown), with the rear lid covering the storage compartment in FIG. 6, the rear lid can be swivelled together with its supporting structure around a rear swiveling axis between an open position situated up and to the back and its covering position relative to the storage compartment while switching the roof cover between its open and closed positions, while in FIG. 7, with the roof cover in the storage position according to FIG. 6, illustrates a position of the rear lid in which it is swivelled relative to its supporting structure into an open position, in which the storage compartment can be used as a "luggage compartment" for loading purposes.

As shown by a comparison of FIGS. 1 and 6, the driving swivel arm 25 that forms the link is swivelled counterclockwise relative to the supporting link 23 while adjusting the cover element 1 formed by the roof cover 2 and the rear lid 3 between the closed position (FIG. 1) for the roof cover 2 and the storage position for the roof cover 2. References to FIG. 6, the roof cover 2 with packet-like roof sections 4 to 6 stacked one atop the other is located in the storage compartment and covered by the rear lid 3. The supporting link 23 itself swivels clockwise around the body coupling 8. In the exemplary embodiment, the supporting link 23 extends diagonally upwards to the front relative to the closed position of the rear lid 3 and roof cover 2 according to FIG. 1, while the driving swivel arm 25 extends diagonally downward to the rear. The angle formed by the driving swivel arm 25 and supporting link 23 as illustrated measures approximately 30°. Given a forwardly open angle of the supporting link 23 relative to the horizontal, the angle formed measures approximately 60°. In the storage position according to FIG. 6, the supporting link 23 extends diagonally downward to the rear, and the driving swivel arm extends diagonally in the upper forward direction from its rotational axis fixed in place relative to the supporting link 23. The supporting link 23 here has an angle that opens toward the rear relative to the horizontal of approximately 30°. The driving swivel arm 25 extends in the upper forward direction and has an angle opening upwardly to the front measuring approximately the same as the angle to the supporting link. The supporting structure 12 of the rear lid 3 is rigidly connected with the supporting structure 12 in the drawings according to FIGS. 1 and 6. The supporting structure is braced in the final locations according to FIGS. 1 and 6 by means of the rotational drive 22 in the closed position of the rear lid 3. In relation to the exemplary embodiment shown, the swiveling path of the driving swivel arm 25 relative to the supporting link 23 measures approximately 300° when swiveling the supporting link 23 in the opposite direction at a swiveling angle of about 150°.

The roof cover 2 is secured to the tubular frame 13 via the rear roof section 6 that is connected to the tubular frame 13 in the area of its longitudinal leg that runs to the front relative to the closed position of the rear lid 3 by means of a kinematic linkage. The linkage is a four-bar linkage that encompasses links 30 and 31, with coupling points 32 and 33 allocated to the supporting structure 12, and coupling points 34 and 35 allocated to the rear roof section 6. In the closed position of the cover elements 1 according to FIG. 1, the links 30 and 31 essentially extend like a parallelogram linkage in the longitudinal vehicle direction.

Similar to the coupling of the rear roof section 6 with the supporting structure 12, the central roof section 5 is coupled with the rear roof section 6 and the front roof section 4 is coupled with the central roof section 5 by means of kinematic linkages in the form of four-bar linkages. The corresponding links are indicated as 36 and 37 or 38 and 39, that form four-bar linkages. The four-bar linkages are designed approximately like parallelogram linkages, specifically extending essentially in the same direction as the links 30 and 31 relative to the respective position of the roof sections 4 to 6 to each other and relative to the rear supporting structure 12.

The link 31 of the four-bar linkage provided between the supporting structure 12 and the rear roof section 6 forms its rearward link relative to the vehicle, and is connected with the supporting link 23 by means of a driving link 40, wherein the respective coupling point is indicated as 41. Viewed from the coupling point 33 on the supporting structure 12, the coupling point 41 on the link 31 lies in an elongated area 42 that projects beyond the coupling point 35 on the rear roof section 6, so that the link 31 forms a two-armed lever on the rear roof section 6 relative to the coupling point 35. A driving link 43 is coupled in a coupling point 44 through which the rearward link 37 is actuated by the kinematic linkage lying in the connection of the rear roof section 6 with the central roof section 5 in addition to the driving link 40 for the rear roof section 6 in the area of the lever arm formed by the elongation 42. The coupling point of the driving link 43 on the link 37 is indicated as 45. Proceeding from the link 37, the front roof section 4 is moved by a driving link 46 in a corresponding manner relative to the central roof section 5.

The rearward link 31 in the connection of the supporting structure 12 with the rear roof section 6 is U-shaped in the illustrated embodiment. The coupling point 35 lies in the central web area, and the coupling point 33 allocated to the leg extends to the supporting structure 12. The opposing leg supports coupling points 41 and 44, wherein coupling point 41 is allocated to the free leg end, and coupling point 44 is allocated to the transition between the leg and web.

The coupling point 35 of the rearward link 31 allocated to the rear roof section 6 has an extension arm 47 of the rear roof section 6 which projects out downwardly through the lower lateral border of the rear roof section 6.

As illustrated by the figures, the configuration of the roof cover 2 and the supporting structure 12 of the rear lid 3 results in a very tightly packed roof package in the storage position. The roof sections 4 to 6 have the same alignment relative to each other as when the roof cover is closed. The roof sections 4 to 6 are stacked in sequence with the roof cover 2 closed, wherein the front roof section 4 is lowermost, and the rear roof section 6 is uppermost. The rear lid 3 covers the rear roof section 6, and the joint coupling of the cover elements 1 with the body also economizes greatly on space in the closed position, owing to the swiveling of the supporting link 23 toward the coupling of the supporting structure 12 of the rear lid 3 against the body. Structurally configuring the rearward link 31 with the depicted U-shape also has a favorable effect on space utilization. In the storage position, the legs of the link extend toward the front roof section 4 and the rear roof section 6 when viewed from the side, similarly to a frame lying to the rear of the roof section packet. This arrangement results in a concentration of the respective rearward links and accompanying driving links in this area, enveloped top and bottom by the supporting structure 12, which is engaged toward the body by the corresponding guiding and driving links. The driving and guiding links are allocated to the lateral areas of the body, creating favorable potential uses for the storage compartment as a luggage compartment, even with the roof cover removed.

Figure 7:
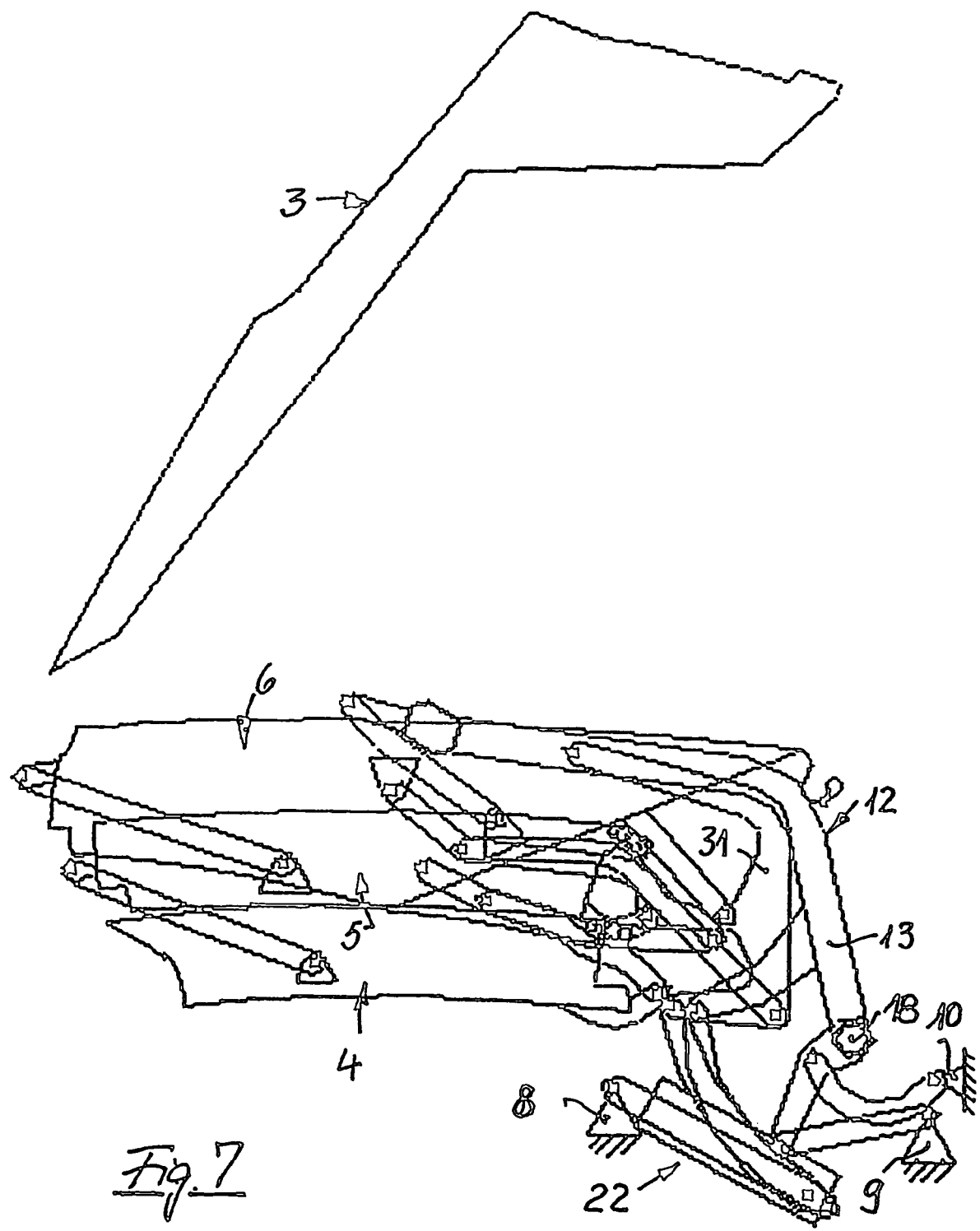

In order to enable conventional use of the storage compartment, the rear lid 3, as shown on FIG. 7, can additionally be upwardly swivelled to the front relative to its supporting structure 12. A corresponding linkage can be provided between the supporting structure 12 and the rear lid 3 (not shown). Such rear lid supports are known from practice, just as corresponding interlocks of the rear lid 3 relative to the supporting structure, if the rear lid 3 is immovably connected with its supporting structure as shown on FIGS. 1 to 6.

By way of illustrating the principle underlying the invention, the roof cover for a motor vehicle with open body is provided as a multipart, in particular at least three-part hardtop, and connecting this hardtop via the separate rear and/or luggage compartment lid running at an angle to the roofline or its supporting structure with the body, The drawings show the simple overall body achievable as a result, which in particular also makes it possible to reduce the couplings on the body to the coupling or couplings for the rear lid. This arrangement also offers favorable opportunities to convert the motions of the rear lid into adjusting movements for the roof sections. This not taking into account the ability to also adjust the roof cover just by way of the actuator drive for the rear lid, or to expand the related capabilities even further by providing at least one extra drive with which the roof sections can be adjusted relative to each other and/or to the rear lid.

While embodiments of the invention have been illustrated and described, it is not intended that these embodiments illustrate and describe all possible forms of the invention.

Rather, the words used in the specification are words of description rather than limitation, and it is understood that various changes may be made without departing from the spirit and scope of the invention.

What is claimed is:

1. A passenger car having a body that defines body openings, and cover elements provided for them, which are movably coupled on the body, have allocated to them an actuator drive supported on the body, and of which one cover element is actuated by the actuator drive where it is supported against the body, and is located in the driving linkage for other cover elements with this body support, wherein a rear access opening to a storage compartment and a roof opening as well as a roof cover as the cover element for the roof opening and a rear lid for the access opening angularly displaced relative to the contour of the roof cover are provided as body openings, and wherein the roof cover consists of several dimensionally stable roof sections, which abut each other in the longitudinal vehicle direction with the roof cover closed proceeding from a rear roof section neighboring the rear lid, and attach to one another in the longitudinal direction of the vehicle, and starting with the rear roof component are sequentially braced against one another by the drive mechanism with the roof cover open, the roof sections are aligned sequentially with upwardly directed roof exteriors with the roof cover closed proceeding from the rear roof section, and lie in the storage compartment that can be closed via the rear lid provided with a supporting structure located in the body support, comprising:

the roof cover carried by the supporting structure of the rear lid, wherein the supporting structure of the rear lid is actuated by the actuator drive; and the roof sections abutting the rear roof section lie under the rear roof section adjacent to the rear lid with the roof cover open;

the supporting structure of the rear lid is connected with the rear roof section via a four-bar linkage, one link of which has couplings to the supporting structure and to the rear roof section having two links lying one in back of the other as a connection to the body; and one link of the two links forms a supporting link that supports the actuator drive acting upon the supporting structure against the body, and can be varied in terms of its angular position relative to the body and other link via the actuator drive.

2. The passenger car according to claim 1, wherein the actuator drive consists of a rotational drive.

3. The passenger car according to claim 2, wherein the rotational drive is allocated to a link arrangement that connects the supporting structure of the rear lid with the body.

4. The passenger car according to claim 3, wherein the rotational drive is integrated into the link arrangement that connects the supporting structure of the rear lid with the body.

5. The passenger car according to claim 3 wherein the rotational drive is allocated to a swiveling axis lying in the connection of two links of the link arrangement.

6. The passenger car according to claim 5, wherein the rotational drive lies between the body-coupled supporting link and a link that is connected with the supporting structure of the rear lid forming a driving swivel arm of the rotational drive.

7. The passenger car according to claim 6, wherein the supporting link forms the basis for the rotational drive.

8. The passenger car according to claim 1, wherein the supporting structure of the rear lid is coupled via a swiveling axis rigidly secured to the body.

9. The passenger car according to claim 1, wherein the supporting structure of the rear lid is coupled to the body via a kinematic linkage.

10. The passenger car according to claim 9, wherein the kinematic linkage located in the body coupling of the supporting structure of the rear lid is a four-bar linkage.

11. The passenger car according to claim 1, wherein mutually abutting roof sections of the roof cover are connected with each other via a kinematic linkage.

12. The passenger car according to claim 11, wherein the kinematic linkage provided in the interconnection of roof sections are four-bar linkages.

13. The passenger car according to claim 1, wherein the actuator drive forms the sole drive for the rear lid and roof cover.

14. The passenger car according to claim 11, wherein the kinematic linkages lying in the connection between the respectively sequential roof sections are each connected via a drive link, and the drive links each connect corresponding links of the kinematic linkages.

15. The passenger car according to claim 14, wherein the links of the kinematic linkages provided between the roof sections connected via the drive links are the links coupled in the rear area of the roof sections relative to the closed roof cover.

16. The passenger car according to claim 1, wherein the link that can be angularly varied relative to the supporting link via the actuator drive is connected as the driving link for the rear roof section with the rearward-directed link relative to the closed position of the roof cover of the kinematic linkage lying in the connection of the rear roof section to the supporting structure of the rear lid.

17. The passenger car according to claim 1, wherein the rear lid is angularly displaced relative to the contour of the roof cover formed by the roof sections.

* * * * *